United States Patent
So et al.

(10) Patent No.: US 7,519,034 B2
(45) Date of Patent: Apr. 14, 2009

(54) METHOD AND APPARATUS FOR CHANNEL ASSIGNMENT WITHIN AD-HOC COMMUNICATION SYSTEM

(75) Inventors: Jungmin So, Urbana, IL (US); Nitin Vaidya, Champaign, IL (US); Jeffrey D. Bonta, Arlington Heights, IL (US); George Calcev, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 852 days.

(21) Appl. No.: 10/951,432

(22) Filed: Sep. 28, 2004

(65) Prior Publication Data

US 2006/0067283 A1    Mar. 30, 2006

(51) Int. Cl.
 *H04Q 7/24* (2006.01)
(52) U.S. Cl. .................. 370/338; 370/355; 370/356
(58) Field of Classification Search .............. 370/310, 370/338, 345, 351, 464, 912, 913, 312, 329, 370/349, 390, 252, 254, 335, 356, 355; 455/422, 455/432, 433, 435, 456, 445, 450, 453
See application file for complete search history.

(56) References Cited

U.S. PATENT DOCUMENTS

| | | | | |
|---|---|---|---|---|
| 6,894,985 B2 * | 5/2005 | Billhartz | ............... | 370/252 |
| 7,027,426 B2 * | 4/2006 | Billhartz | ............... | 370/338 |
| 7,376,100 B2 * | 5/2008 | Chang | ............... | 370/329 |
| 2005/0063319 A1 * | 3/2005 | Kyperountas et al. | ....... | 370/254 |

OTHER PUBLICATIONS

Kai Liu; Wong, T.; Jiandong Li; Bu, L.; Han, J.;; A reservation-based multiple accesss protocol with collision avoidance for wireless multihop ad hoc networks, Communications, 2003. ICC '03. IEEE International Conference on , vol. 2, May 11-15, 2003, pp. 1119-1123 vol. 2.

Padhye et al. ; "Routing in multi-radio, multi-hop wireless mest networks" by from Microsoft. This is publishedin Mobicom 2004.

* cited by examiner

*Primary Examiner*—CongVan Tran

(57) ABSTRACT

A method and apparatus for channel assignment within an ad-hoc communication system utilizing multiple channels is provided herein. Individual nodes receive and send route-request (RREQ) packets on all channels rather than a single channel. Each route-request packet comprises a first and a second table. The first table comprises a channel state for the link and the second table comprises a channel quality metric for the link. Each node updates the channel state and channel quality tables and forwards them in the RREQ packet as part of the route-discovery process. When channel selection is made, the channel selection is based on the channel state and the channel quality tables.

2 Claims, 4 Drawing Sheets

100

101

METHOD AND APPARATUS FOR CHANNEL ASSIGNMENT WITHIN AD-HOC COMMUNICATION SYSTEM

FIELD OF THE INVENTION

The present invention relates generally to ad-hoc communication systems, and in particular, to a method and apparatus for assigning a channel within such ad-hoc communication systems.

BACKGROUND OF THE INVENTION

Ad-hoc networks allow mobile nodes to form a multi-hop network for peer-to-peer communication. Typical ad-hoc system protocols use a common channel for communication between all nodes. The use of a common channel puts a limitation on the network performance. For example, it has been shown that as the node density increases, the network performance is rapidly degraded due to channel contention. To overcome this limitation and increase the network performance, prior-art systems have employed the use of multiple channel protocols. However, these protocols require multiple transceivers or temporal synchronization to coordinate the channel usage, increasing system complexity. The use of multiple channels improves network performance since simultaneous transmissions can take place in the same area on differing channels without interfering with each other. The fundamental problem with using multiple channels comes from the fact that a node can only listen to one channel at a time. If two neighboring nodes are listening on different channels, they will be unable hear each other, and communication between the nodes becomes impossible. This creates significant problems for routing packets through an ad-hoc network. Therefore, a need exists for a method and apparatus for channel assignment within an ad-hoc communication system utilizing multiple channels, and yet allows all nodes within the communication system to communicate with each other.

DETAILED DESCRIPTION OF THE DRAWINGS

Figure 1:
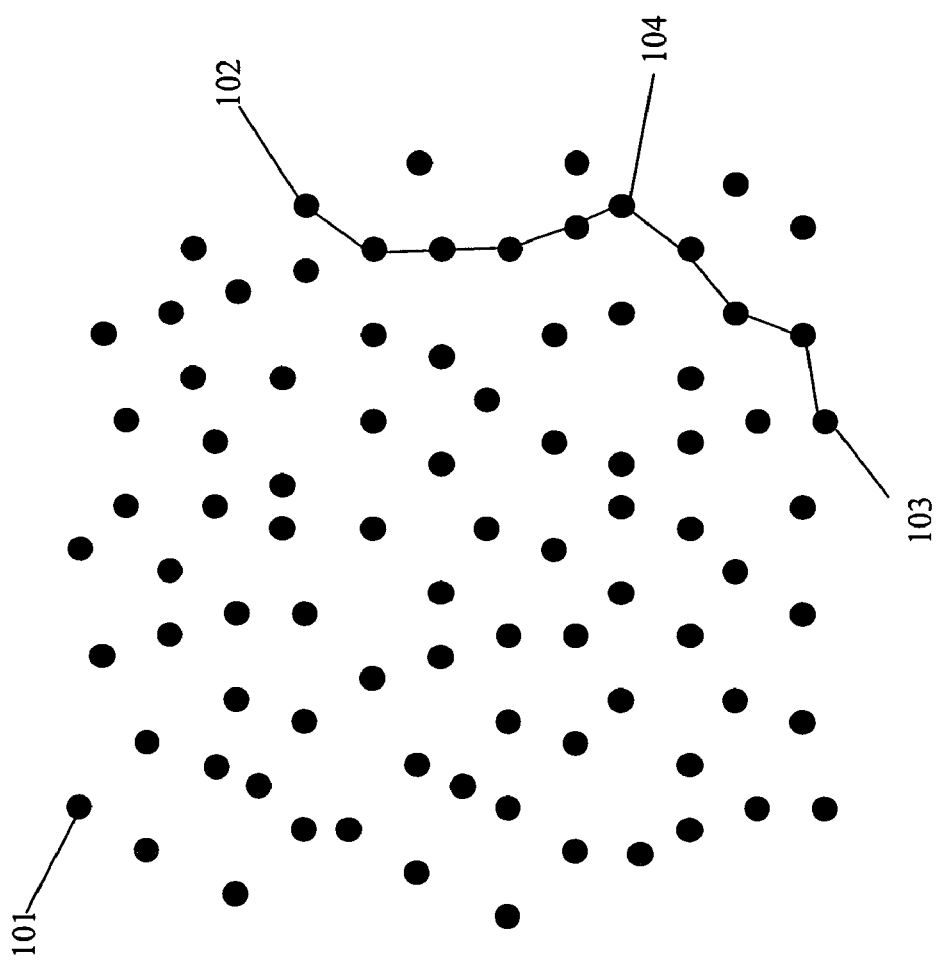
FIG. 1 is a block diagram of an ad-hoc communication system.

To address the above-mentioned need a method and apparatus for channel assignment within an ad-hoc communication system utilizing multiple channels is provided herein. More particularly, individual nodes receive and send route-request packets on all channels rather than a single channel. Each route-request packet comprises a first and a second table. The first table comprises a channel state for the link and the second table comprises a channel quality metric for the link. Each node updates the channel state and channel quality tables and forwards them as part of the route-discovery process. When channel selection is made, the channel selection is based on the channel state and the channel quality tables.

The present invention encompasses a method for a node to aide in channel assignment within an ad-hoc communication system. The method comprises the steps of receiving a route-request (RREQ) packet on a first frequency comprising a first and a second table of information, determining a channel state for a plurality of channels, and determining a channel quality for the plurality of channels. The first table is updated based on the channel and the second table is updated based on the channel quality. Finally the RREQ packet is transmitted having the updated first and second tables to all neighboring nodes, where the transmission takes place on all available frequencies and is utilized for channel assignment.

The present invention additionally encompasses a method for channel assignment. The method comprises the steps of receiving a route-request (RREQ) packet on a first frequency, comprising a first and a second table of information. A channel state and channel quality metric is determined for a plurality of channels and the first and the second tables are updated based on the channel state and the channel quality. A best channel for transmission is determined based on the first and the second tables, and a route-reply (RREP) packet is transmitted comprising the best channel.

The present invention additionally encompasses a node comprising a receiver having a route-request (RREQ) packet as an input on a first frequency, logic circuitry determining a channel state for a plurality of channels, determining a channel quality for the plurality of channels, updating the first table based on the channel state, and updating the second table based on the channel quality. Finally, the node comprises a transmitter transmitting the RREQ packet having the updated first and second tables to all neighboring nodes, where the transmission takes place on all available frequencies and is utilized for channel assignment.

The present invention additionally encompasses a node comprising a receiver having a route-request (RREQ) packet as an input on a first frequency, logic circuitry determining a channel state for a plurality of channels, determining a channel quality for the plurality of channels, updating the first table based on the channel state, updating the second table based on the channel quality, and determining a best channel for transmission based on the first and the second tables. A transmitter is provided outputting a route-reply (RREP) packet comprising the best channel.

Turning now to the drawings, wherein like numerals designate like components, FIG. 1 is a block diagram of communication system 100. Communication system 100 comprises an ad-hoc communication system employing one of the IEEE 802.11 (e.g., a, b, g or e) ad-hoc networking protocols, however in alternate embodiments of the present invention communication system 100 may comprise any ad-hoc network, such as, but not limited to the IEEE 802.15 system protocol used in systems such as a neuRFon™ communication system, available from Motorola, Inc., a BLUETOOTH network protocol, . . . , etc.

As shown, communication system 100 comprises a plurality of nodes 101. Nodes 101 form a communication network, with each node capable of short-range communication to neighboring nodes only. When communication is desired between nodes 101 that are not within communication range of each other, the transmissions are routed through intervening nodes. Thus, for example, if node 101 wishes to communicate to node 102, the communication will pass through intervening nodes 104 (only one intervening node labeled in FIG. 1).

As discussed above, as the node density increases, the network performance is rapidly degraded due to channel contention. In order to address this issue, multiple channels are utilized to communicate between nodes 101 of communication system 100. Multiple channels improve network performance because simultaneous transmissions can take place in the same area without interfering with each other. In order to allow each node to communicate with each other, a multi-channel route discovery process is disclosed herein where individual nodes send and forward route-request packets on all channels rather than a single channel.

Performing route discovery simultaneously on multiple channels requires nodes to dynamically switch channels and it is assumed that the channel switching delay is less than 80 microseconds. Network performance is improved by allocating different channels to different flows or data sessions, thus allowing simultaneous transmissions in a region utilizing the various channels available. In the preferred embodiment of the present invention the number of channels is small, such as three or four; however, in alternate embodiments more channels can be utilized.

Figure 2:
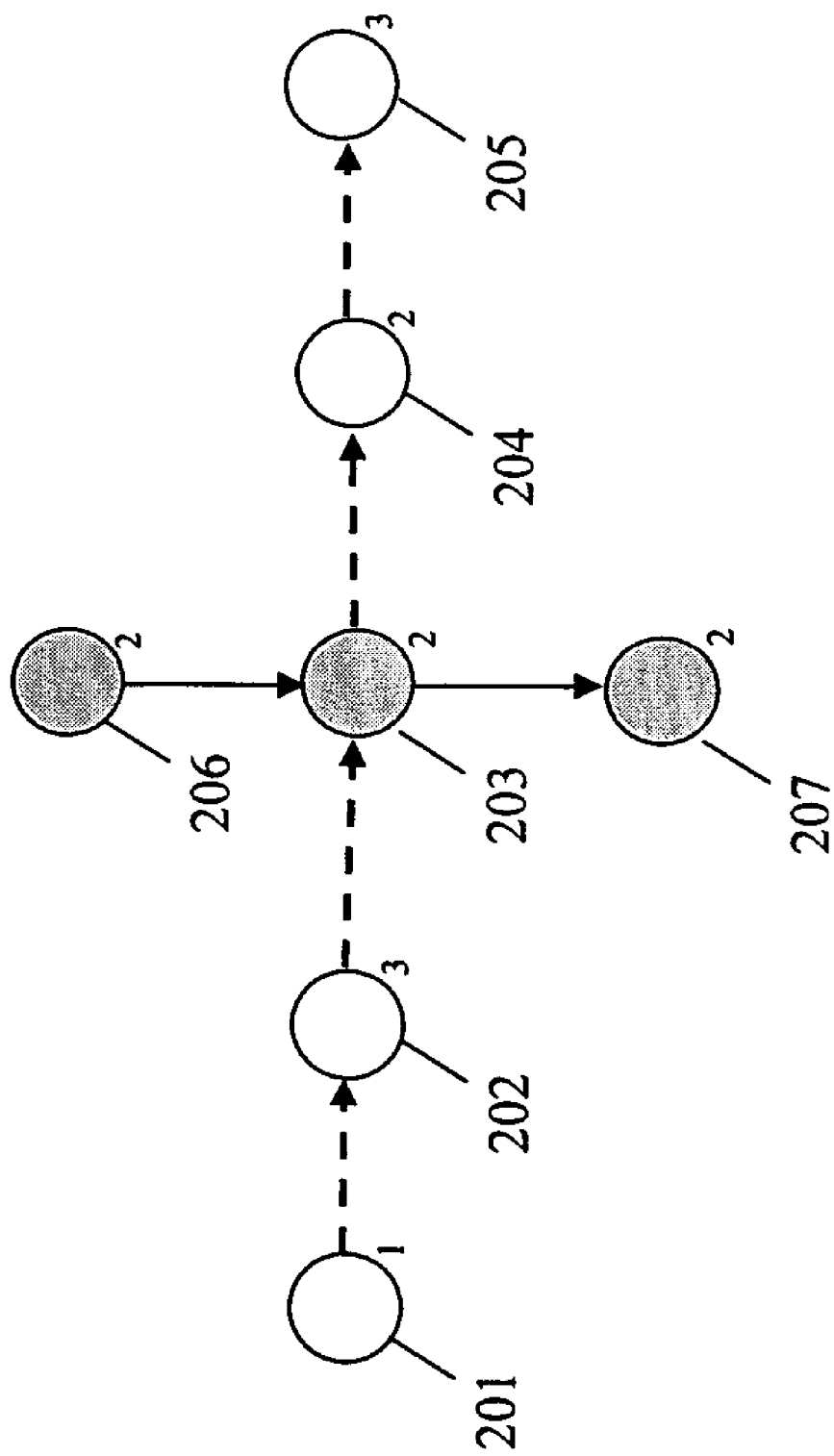
FIG. 2 is a more-detailed block diagram of the communication system of FIG. 1.

Consider the scenario depicted in FIG. 2 where three channels are utilized for communication among nodes 201-207. At initialization, each node 201-207 chooses a random channel and stays on that channel until conditions warrant a change or until the protocol demands a change. In the example of FIG. 2, node 206, node 203, and node 207 are involved in an active data flow using channel 2. When node 201 wants to send packets to node 205, node 201 starts a route request by sending RREQ (route request) packets on all channels, one by one since nodes only have a single transceiver. For example, with three channels being utilized, node 201 sends a RREQ on channel 1, switches to channel 2, sends a route-request packet on channel 2, and so on. After sending route requests on all channels, node 201 returns to its original channel. A channel table is included within the RREQ packet which records the channel state of nodes along the path from node 201 to node 205. All nodes 201-207 must be in one of the following four states:

Free Node—a free node does not have any active flows, so it is free to switch channels.

Locked Node—a locked node is in a path supporting an active flow, so its channel is set and does not change while the flow is active.

Switching Node—a switching node is in a path supporting an intersection between two active flows and is switching between two channels to support the flows.

Hard-Locked Node—a hard-locked node is a neighbor to a switching node and is not permitted to be a switching node. A hard locked node knows that it is hard locked because it periodically receives a LEAVE/JOIN messages indicating that the neighboring switching node is periodically changing channels.

The node that starts the route request will record its channel state in the channel table of the RREQ packet (if necessary since a free node does not add anything to the channel table (see below)). Then as the packet is forwarded to the destination, intermediate nodes also cumulatively record their channel state in the channel table (if necessary). In particular, A free node does not add anything to the channel table.

A locked node adds one to the field corresponding to the channel the node is currently utilizing.

A switching node adds a one to the fields corresponding to both channels it is switching between.

A hard-locked node adds two to the field corresponding to its locked channel.

The locked channel is the channel that the node is currently operating on to support a data flow. A locked node (and a hard locked node) can only be on one channel at a time.

When the RREQ arrives at the destination, the destination node uses the channel table as a metric in route selection.

With reference to FIG. 2, node 201 sends a RREQ packet looking for node 205. In this example, node 201, node 202, node 204, and node 205 are free nodes, while node 206, node 203, and node 207 are locked on channel 2 in an active flow. Then as the RREQ is forwarded through the nodes, only node 203 will add one to the channel 2 field in the channel table. So the resulting channel table received by channel node 205 will look as illustrated in Table 1.

TABLE 1

Channel Table

| Channel # | Cumulative State Value |
|---|---|
| 1 | 0 |
| 2 | 1 |
| 3 | 0 |

At each node along the path to the destination, a reverse path is set up using information contained in the RREQ packet. For example, the RREQ packet contains the channel that the sending node is operating on. Once the RREQ reaches the destination, the destination node selects a channel for the new flow according to the information provided from the channel table. The selected channel is passed back to the source in a RREP (route reply) packet on the channel provided in the previous RREQ packet. As the RREP travels from node 205 to node 201, the nodes in the path switch channels and node states as follows. Suppose the selected channel is channel 1. Each free node (node 201, node 202, node 204, and node 205) becomes a locked node and switches to channel 1. If an existing locked node is on channel 1, nothing changes. If an existing locked node is on a different channel (e.g. node 203 is on channel 2), then it becomes a switching node (in the case of node 203, switching between channels 1 and 2). If an existing node is a switching node, nothing changes provided that channel 1 was one of its switching channels. If not, then the RREP packet is dropped. Finally, if there were a hard-locked node, nothing would change provided it was on channel 1. Otherwise, it would drop the RREP packet.

The above procedure allows the use of multiple channels within an ad-hoc communication system, yet allows nodes to contain only one transceiver, operating on a single frequency at a time. The use of multiple channels improves network performance since simultaneous transmissions can now take place in the same area on differing channels without interfering with each other.

Channel selection must be performed to maximize the performance of the network. In addition to the channel table passed in the RREQ packet, each node passes a channel selection metric in the RREQ packet. The channel selection metric is designed to define the bottlenecks in channel performance. A channel metric is computed for each channel at each node along the path from node 201 to node 205. The metric is a value that represents the quality for each channel. In the preferred embodiment of the present invention, the channel quality comprises an interference metric (i.e., how much interference is perceived for each channel). More specifically, the channel should be chosen which maximizes the throughput at the bottleneck node. Suppose there is a metric $x_c(i)$ denoting the interference level of channel c around node i in the path from S to D. Then the path interference level $I_{SD}$ is:

$$I_{SD} = \min(\max(x_c(i), i \in P_{SD}), c \in C)$$

Where $P_{SD}$ is the path from node S to D and C is the set of candidate channels. The selected channel is the one which has the minimum $I_{SD}$.

In alternate embodiments, other quality indicators may be utilized. Such quality indicators include, but are not limited to achievable throughput, congestion, and channel load (number of flows in the neighborhood). Each node uses idle time to "sniff" activity on each channel to derive these metrics. In the case of channel load, a low duty cycle of HELLO messages is used to collect this information from neighbors.

Importance can be assigned to each parameter with weighting multipliers, but in the end the computed channel metric is updated in a table that is forwarded in the RREQ packet. The channel selection metric that is forwarded is dependant on the metric received from previous nodes. In particular, each node passes its quality measurements for all channels where comparison is made between the current node's quality metric and the quality metric received from previous nodes. The poorest quality metric is updated in the channel quality table by updating the quality metric with the above equation. This allows the destination to determine which channels are the worst choice using a combination of the channel selection metric and the channel-state table. Such a channel-quality table is illustrated below.

TABLE 2

Channel-quality table

| Channel # | Quality factor |
|---|---|
| 1 | 8 |
| 2 | 1 |
| 3 | 6 |

When the destination node receives the RREQ, it first determines whether any channel selection creates an infeasible network configuration. Based on the cumulative sum of values in the channel-state table, the route from node 201 to node 205 is considered infeasible if:

Multiple channels have values greater or equal to 2, or

More than two channels have values greater or equal to 1.

If either of the above conditions is true, then no RREP is returned to the source. This intent of the above conditional return of the RREP is to prevent two adjacent switching nodes along a path between the source and destination. To achieve this objective, some conservative measures are required to guard against such a configuration. For example, if two channels have a value of 1 (indicative of being locked on a channel), it may be necessary to select one of those channels rather than choosing a different channel that could result in both locked nodes being adjacent switching nodes. During the forwarding of the RREQ packet, it is possible that an intermediate node may recognize that a route is infeasible based on the channel table that it has received. In this case, the intermediate node will drop the RREQ to stop this leg of the route discovery from continuing.

Once it has been determined that the route is feasible, then the channel selection metric is evaluated to select the best channel. In Table 2, it is evident that channel 1 is the optimal choice and channel 2 is the worst choice in terms of the "quality factor". The destination node would then choose channel 1 as the channel to transmit data between device 201 and 205.

The above-described protocol enables the destination node to select a channel for the ensuing flow to operate on based on the channel table and channel selection metric in the RREQ.

An alternate embodiment could enable the source node to select the channel by requiring the destination node and each intermediate node to build the channel selection metric and forward it along the reverse path during the transmission of the RREP. This would enable identifying and selecting between multiple paths such that the creation of a switching node is avoided if an alternate path allows two data flows to cross over each other on different carriers. The route selection algorithm would be responsible for selecting the alternate carrier to avoid the contentious use of the same carrier if overall throughput was not adversely affected.

If a switching node is established, it will be necessary for the switching node and the adjacent hard-locked nodes to synchronize communication so that the switching node is not semi-permanently deaf to one of the flows of traffic. This can be accomplished in a couple different ways. In the preferred embodiment, a simple handshake occurs between the switching node and its adjacent hard-locked nodes. During this handshake, the switching node will multicast a LEAVE message on its current channel indicating that any further communication with it will not be possible until the adjacent nodes receives a JOIN message from the switching node. This will require the adjacent nodes to buffer any data that must pass to or through the switching node. Having sent the LEAVE message, the switching node is free to switch to the alternate channel where it must immediately transmit a JOIN message on the alternate channel to inform the adjacent hard locked nodes on this channel that communication can resume. Therefore, each time a switch is required, the LEAVE/JOIN messages must be transmitted to control the data flow. Note that during route discovery when a switching node is encountered it is mandatory that the switching node remain on the channel that it received the RREQ on until it receives a RREP. This is because the adjacent node will not know when to send the RREP if the switching node is alternating between two channels. In an alternate embodiment, a transmission schedule can be established based on the clocks of the adjacent nodes to identify exactly how long a node must wait until the switching node is ready to communicate on the channel of interest.

In order to improve the success of establishing connections in this multi-carrier environment, it is necessary to require that idle nodes periodically monitor the activity of the carrier they are currently on, and then automatically switch to a different carrier if the activity of the carrier is above a certain threshold. In other words, each node will monitor each channel to collect channel quality metrics for each channel and move away from channels that are occupied to avoid contention. From the above example, if node 202 or node 204 were initially operating on carrier 2 (same carrier that node 206, node 203, and node 207 are actively using), then an attempt by node 201 to send a RREQ to node 202 or an attempt by node 205 to send a route response to node 204 might result in contention of the channel when node 203 is transmitting. However, if nodes node 202 and node 204 noticed that carrier 2 was actively being used and then proactively switched to carrier 1, the contention problems would potentially go away (unless carrier 1 was also active nearby, in which case another switch could occur until an idle carrier was found).

In order to dynamically share spectrum with other users of the multiple carriers, it is necessary to be able to move a data flow from a path on one carrier to a path on a carrier that is free from interference. During times between packets when a session must relinquish the channel as a condition of fairness required by 802.11, each node should periodically switch channels to measure alternate channels and assess the level of interference/contention on those channels. Then, in the event that a resumption of the existing data flow on the current path detects channel contention for a predetermined threshold of time, the source node will be informed of the contention problem as a function of route maintenance and will initiate a new route discovery with the intent of selecting an alternate channel for the existing data flow to operate on.

A further enhancement of the above-described protocol to improve throughput will break the rule of no two adjacent nodes along a flow being allowed to be switching nodes. The enhanced protocol is executed if a switching node is established between two flows. At that time, the neighbor nodes adjacent to the switching node in the new path also become switching nodes with the purpose of further enhancing throughput otherwise hampered by the hidden node problem. For example, if nodes node 202 and node 204 were allowed to switch between carrier 1 and 3 while node 201 and node 205 were fixed to carrier 1, then each time data needed to flow from node 201 to node 205, node 201 could transfer data to node 202 on carrier 1 while node 203 transferred data to node 204 on carrier 3. Conversely, node 205 could transfer data to node 204 on carrier 1 while node 203 transferred data to node 202 on carrier 3. In fact, this could be generalized to say that anytime 4 or more nodes are transmitting data across a path (even if there isn't another path that crosses this path), there may be an advantage in allowing 2 carriers to be assigned and the intermediate nodes become switching nodes. Again as an example, if data is being transmitting from node 201 to node 204, then allowing node 202 and node 203 to be switching nodes will enable node 201 to transfer data to node 202 while node 203 transfers data to node 204.

Finally, in systems that become congested at a node, another enhancement would force one of the sources of the data flows to perform route discovery again in an effort to switch the path to a different carrier that makes the bottleneck node a switching node. For example, if flows from node 206 to node 207 and flows from node 201 to node 205 are both operating on carrier 2, and if node 201 determines that congestion is impacting throughput/latency, then route discovery can be repeated by node 201 with the intent of nodes 201 and 202 and nodes 204 and 205 switching to carrier 1 and node 203 becoming a switching node.

Figure 3:
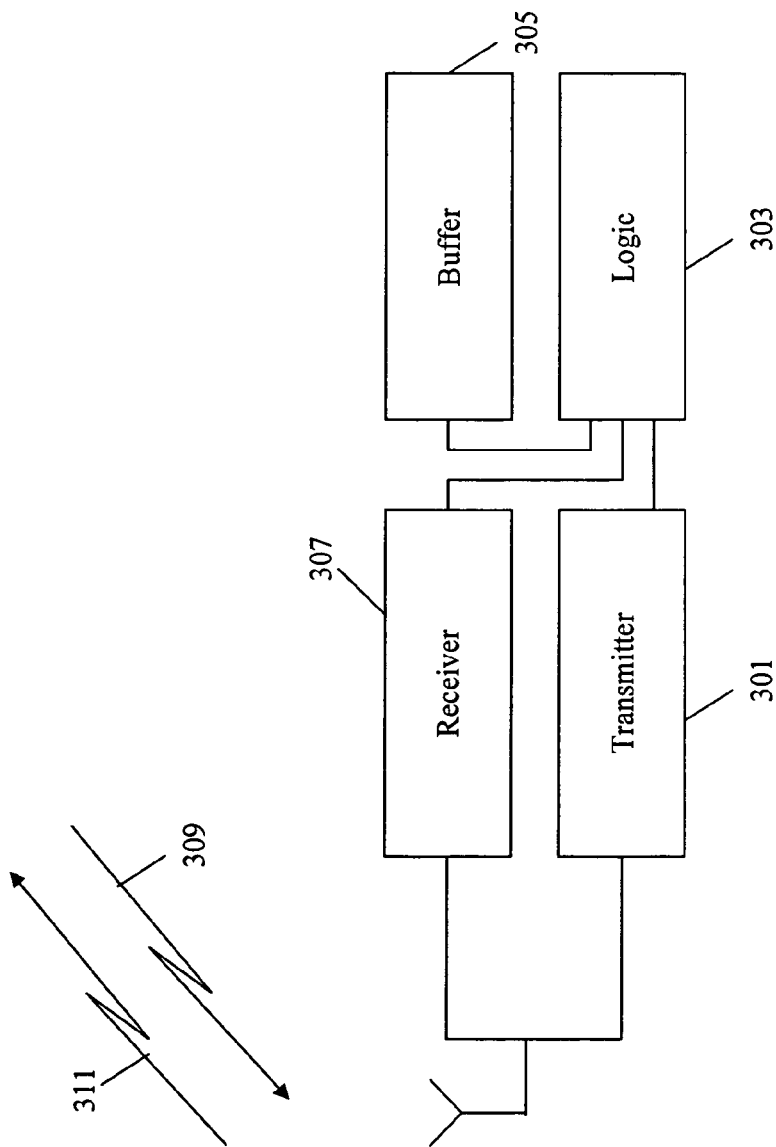
FIG. 3 is a block diagram of a node existing within the communication system of FIG. 1.

FIG. 3 is a block diagram showing node 101 of FIG. 1. As shown, node 101 comprises transmitter 301, receiver 307, buffer 305, and logic circuitry 303. Logic circuitry 303 is preferably a microprocessor/controller such as a PowerPC microprocessor available from Motorola, Inc. As discussed above, transmitter 301 and receiver 307 are designed to operate utilizing the 802.11 network protocol; however in alternate embodiments transmitter 301 and receiver 307 may utilize other network protocols. Additionally, although transmitter 301 and receiver 307 are shown as separate entities, one of ordinary skill in the art will recognize that much of the circuitry can be shared among these devices. While node 101 is acting as an intervening node, it is continuously receiving transmissions 309 (via receiver 307) from another remote unit utilizing the ad-hoc air interface and relays (prior to, or after, buffering via buffer 305) these transmissions to another node utilizing the ad-hoc air interface.

Figure 4:
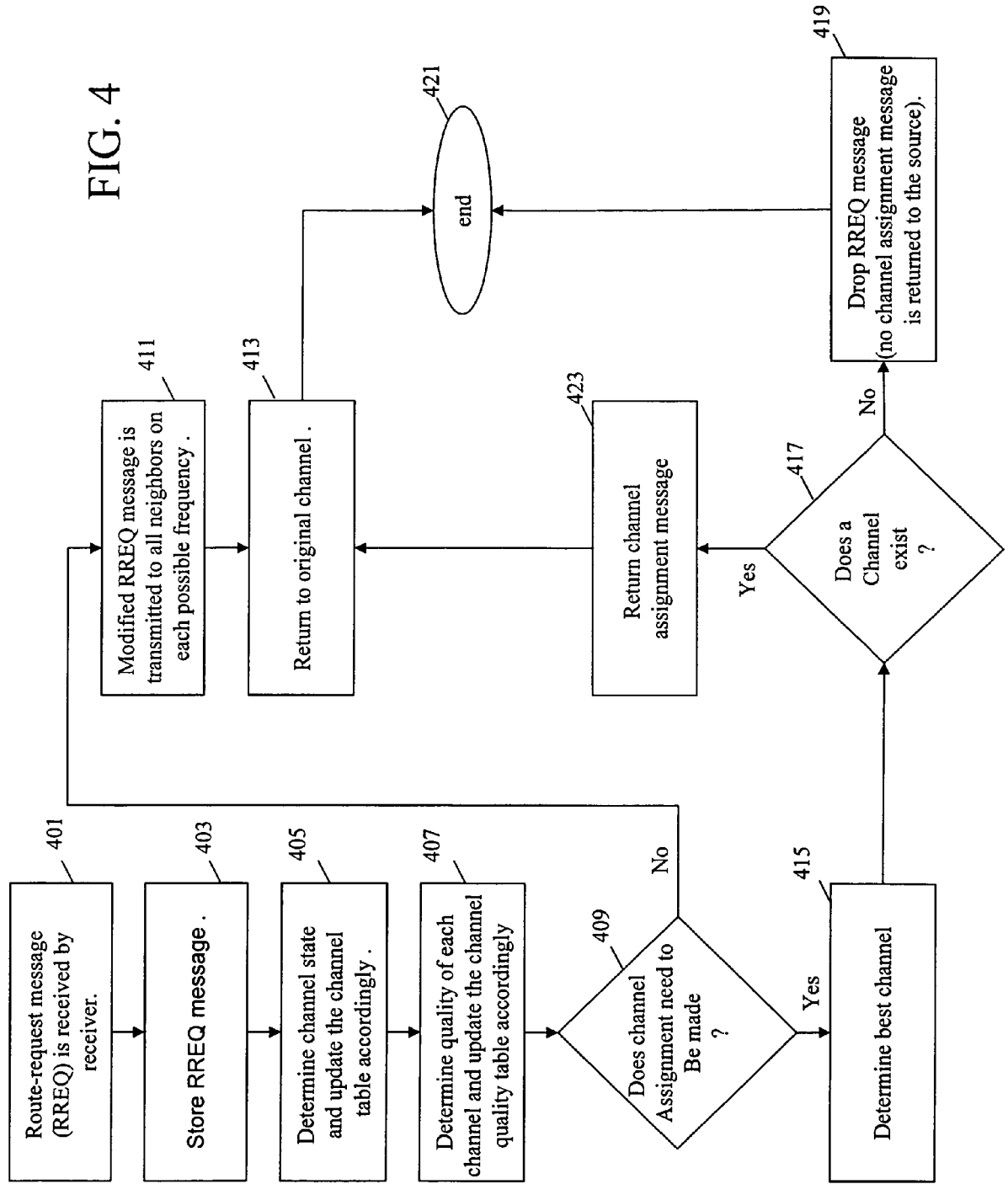
FIG. 4 is a flow chart showing operation of the node of FIG. 3 during route discovery.

FIG. 4 is a flow chart showing operation of the node of FIG. 3 during route discovery. Node 101 can comprise either a source, intervening node, aiding in channel assignment, or destination node determining the appropriate channel. The logic flow begins at step 401 where a route-request message (RREQ) is received by receiver 307 on its original channel (frequency). As discussed above, the RREQ message comprises a first table, a second table, and perceived channel quality. The first table comprises a channel table comprising information on channels available to intervening nodes, while the second table comprises a channel-quality table comprising information on channel quality perceived by intervening nodes. The table is temporarily stored in buffer 305 (step 403). At step 405, logic circuitry determines its channel state for each channel and updates the channel table based on the channel state. As discussed, a free node does not add anything to the channel table; a locked node adds one to the field corresponding to the channel the node is currently utilizing; a switching node adds a one to the fields corresponding to both channels it is switching between; and a hard-locked node adds two to the field corresponding to its locked channel.

Continuing, at step 407 logic circuitry 303 determines the quality of each channel and updates the channel-quality table based on the channel quality of each channel. More particularly, the computed channel quality is updated in the channel-quality table provided that it is worse than the channel quality of previous nodes.

Once the tables have been updated, logic circuitry 303 determines if channel assignment needs to be made (step 409). More particularly, if node 101 is the destination node, then the RREQ message does not need to be further transmitted, and logic circuitry 303 will need to determine a channel (if any) and transmit the channel information back to the source node via a RREP (route reply) packet transmitted on the channel provided in the previous RREQ packet. Thus, if at step 409 it is determined if a channel assignment does not need to be made, the modified RREQ message is then transmitted to all neighbors on each possible frequency (step 411). Thus, transmitter 301 sends the modified RREQ message on channel 1, switches to channel 2, sends the modified RREQ message on channel 2, and so on. After sending route requests on all channels, transmitter 301 returns to its original channel at step 413, and the logic flow ends at step 421.

If, however, it was determined at step 409 that a channel assignment needs to be made, the logic flow continues to step 415 where the best channel is determined based on the first and the second tables received in the RREQ message. More particularly, at step 415 all feasible channels are analyzed and the one having the highest quality value is determined. The logic flow continues to step 417 where it is determined if a channel exists for communication. If so, the logic flow continues to step 423 where the RREP message is returned with the channel information. If, however, it is determined that a channel does not exist, then the logic flow continues to step 419 where the RREQ message is dropped, resulting in no channel assignment (step 419) and the logic flow ends at step 421.

While the invention has been particularly shown and described with reference to a particular embodiment, it will be understood by those skilled in the art that various changes in form and details may be made therein without departing from the spirit and scope of the invention. For example, systems employing communication protocols such as TDMA, CDMA, . . . , etc. can have their RREQ messages broadcast using a pre-defined channel (i.e., timeslot or code). Additionally, while the above-described system utilizes an on-demand routing protocol, other on-demand, proactive, or hybrid routing protocols could utilize the above channel-selection procedure. It is intended that such changes come within the scope of the following claims.

The invention claimed is:

1. A method for a node to aide in channel assignment within an ad-hoc communication system, the method comprising the steps of:

receiving a route-request (RREQ) packet on a first frequency, the RREQ packet comprising information;

determining if the node is acting as an intersection between two active flows and is switching between two channels to support the flows;

determining a channel quality taken from the group consisting of an interference metric, an achievable throughput, a congestion, and a channel load;

updating the information based on if the node is acting as an intersection between two active flows and is switching between two channels to support the flows, and additionally updating the information based on the channel quality;

transmitting the RREQ packet having the updated information to all neighboring nodes, wherein the transmission takes place on all available frequencies and is utilized for channel assignment.

2. The method of claim 1 wherein the step of updating the information based on the channel quality comprises the step of updating a field based on the current quality and the quality in the route-request packet.

* * * * *